Patented Sept. 5, 1933

1,925,935

UNITED STATES PATENT OFFICE 1,925,935

SYNTHETIC RESIN

Paul Robinson, Llanerch, Pa., assignor to E. I. du Pont de Nemours & Company, Wilmington, Del., a corporation of Delaware No Drawing. Application May 20, 1931
Serial No. 538,879

8 Claims. (Cl. 260—8)

This invention relates to the production of synthetic resins and more particularly it relates to a new process for making oil-modified polyhydric alcohol-polybasic acid resins.

Synthetic resins have been made in a variety of ways, one of the most important of which is to react a polyhydric alcohol, such as glycerol, with a polybasic acid or its anhydride, such as phthalic anhydride with or without modifying agents such as monobasic acids, nondrying oils and drying oil acids.

In making resins of the polyhydric alcohol-polybasic acid type in accordance with the method disclosed herein I'am enabled to avoid the disadvantages which accompany the use of heat in the prior practice. Heat causes undue polymerization of the drying oil, resulting in a resinous material of objectionally high viscosity. The use of alkali to bring about saponification of the oil results in severe discoloration. In either of these methods, the oil is frequently altered in other undesirable ways.

This invention has as an object an improved process for the manufacture of oil modified polyhydric alcohol-polybasic acid resins. A further object is the reduction in the cost of manufacture of these resins. A further object is the preparation of rapidly drying resins of low viscosity. A still further object is the development of a new process for preparing these resins without sacrifice of any of the desirable qualities possessed by resins prepared by older methods.

These objects are accomplished by the following invention, which consists in partially hydrolyzing triglycerides in the presence of water and an appropriate enzyme for the production of glycerides lower than the triglyceride, and heating the partially esterified glycerides with a suitable polybasic acid and a polyhydric alcohol until the resin is formed.

The following three examples illustrate the method of forming the partially esterified glycerides, or intermediate, from which the resin is prepared:

Example I

*Linseed oil intermediate*

| | Parts by weight |
|---|---|
| Alkali refined linseed oil | 200 |
| Water brought to a pH of 5 with a phosphate buffer | 200 |
| Enzyme preparation | 8 |

This enzyme preparation is prepared as follows: The necessary amount of castor beans is placed in a damp atmosphere at 25° C. and allowed to remain there for several days until germination has started. They are then thoroughly ground with an equal weight of fine sand and .5% toluene. The mixture is freshly prepared for each run and used directly as a source of lipase. The buffer solution referred to should not contain more than 2% of phosphates.

These materials are thoroughly mixed in a container from which the air has been largely excluded, and agitated periodically. The temperature is kept at 25° C. After standing for about 30 days, the upper oily layer will be found to have an acid number of about 73.

Example II

*Linseed oil intermediate*

The procedure and proportions of Example I are duplicated, substituting, however, for the castor bean enzyme preparation, a similar one prepared in the same way from sprouted flax-seed. After standing for about 26 days, the upper oily layer will have an acid number of about 7. It will be noticed that the hydrolysis proceeds much more slowly when the flax-seed preparation is used.

Example III

*Tung oil intermediate*

The following materials were placed in a closed container and agitated periodically for about 75 days, the temperature being maintained at 25° C.:

| | Parts by weight |
|---|---|
| Tung oil | 100 |
| Buffer solution | 50 |
| Castor bean enzyme preparation | 5 |
| Toluene | 0.5 |

After 75 days have elapsed, it will be found that the acid number of the upper oily layer is about 61.

The resins may be made from oil intermediates of the type indicated above by the procedure given in the following examples:

Example IV

*Preparation of resin from linseed oil intermediate*

| | Parts by weight |
|---|---|
| Intermediate | 206 |
| Phthalic anhydride | 96 |
| Glycerol | 42 |

The solids are separated by filtration of the reaction products obtained as in Example I. Two hundred and six parts by weight of the filtrate is mixed with 96 parts by weight of phthalic anhydride in an open container and the mixture heated until nearly all of the water had been given off. Forty-two parts by weight of glycerol is then added and heating continued at 250° C. until the resin shows a tendency to string. At this point, it will have an acid number of 20. This resin is entirely clear, not excessively dark, and has drying properties decidedly superior to those of similar resins made by former methods. It is soluble in the usual solvents.

EXAMPLE V

*Resin from product of Example III*

| | Parts by weight |
|---|---|
| Intermediate | 72 |
| Glycerol | 12 |
| Phthalic anhydride | 15 |

The reaction products obtained from Example III are filtered to remove solids and a resin made from the oil layer, the water layer being discarded. Seventy-two parts by weight of the oil layer is heated with fifteen parts by weight of phthalic anhydride for 30 minutes at 200° C. Twelve parts by weight of glycerine is then added and heating continued for an hour, or until the resin shows a slight string. At this point, it will have an acid number of 6.6, giving an entirely clear solution.

Although the foregoing examples mention only linseed oil and China-wood oil, it is to be understood that other glycerides commonly used as modifiers for polyhydric alcohol-polybasic acid resins may be employed. Any enzyme known to produce hydrolysis of glycerides may be utilized in the preparation of the intermediates. Accelerators other than phosphates may be added, although it is usually desirable to keep the amount of these below 2%. It is desirable to add toluene or similar material to prevent the growth of fungi. Other polyhydric alcohols, as ethylene glycol, and other alcohols usually used in the manufacture of polyhydric alcohol-polybasic acid resins, may be used in the preparation of the resins instead of the glycerol mentioned in the examples. Other polybasic acids, such as succinic, useful in the manufacture of polyhydric alcohol-polybasic acid resins, by the usual methods, may also be used in the present process. Natural gums may also be added when desired.

The process of the present invention finds wide application in the preparation of all modified polyhydric alcohol-polybasic acid resins. The resins produced by my new process are useful generally in compositions, particularly coating and plastic compositions, where resins of this type are usually used. By the use of the method disclosed herein the manufacture of oil modified polyhydric alcohol-polybasic acid resins is simplified, and for a given composition and acid number resins of unusually low viscosity may be prepared. In some cases, more rapidly drying products are obtained. Resins containing any desired amount of phthalic glyceride may be made by varying the amount of phthalic anhydride and glycerol used, it being understood that these ingredients are preferably used in chemically equivalent amounts. In some instances resins which cannot be prepared by the usual methods may be made by my new process. Thus, a tung oil resin containing the same proportion of phthalic glyceride as the resin prepared according to Example V cannot be heat-treated according to the common methods for a sufficient length of time to obtain satisfactory resinification owing to the undue increase in viscosity or gellation of the tung oil portion.

As many apparently widely different embodiments of this invention may be made without departing from the spirit and scope thereof, it is to be understood that I do not limit myself to the specific embodiments thereof except as defined in the following claims:

I claim:

1. A process of making polyhydric alcohol-polybasic acid resins which comprises partially hydrolyzing a glyceride by fermenting it in the presence of water with an enzyme capable of hydrolyzing glycerides, and esterifying the glyceride resulting from the fermentation with an organic polybasic acid.

2. A process of making polyhydric alcohol-polybasic acid resins which comprises partially hydrolyzing a glyceride by fermenting it in the presence of water with an enzyme capable of hydrolyzing glycerides, and esterifying the glyceride resulting from the fermentation with phthalic anhydride.

3. A process of making polyhydric alcohol-polybasic acid resins which comprises partially hydrolyzing a glyceride by fermenting it in the presence of water with an enzyme capable of hydrolyzing glycerides, and heating the partially esterified glycerides resulting from the fermentation with an organic polybasic acid and a polyhydric alcohol.

4. A process of making polyhydric alcohol-polybasic acid resins which comprises partially hydrolyzing a glyceride by fermenting it in the presence of water with an enzyme capable of hydrolyzing glycerides, and heating the partially esterified glycerides resulting from the fermentation with phthalic anhydride and glycerol.

5. A process of making polyhydric alcohol-polybasic acid resins which comprises partially hydrolyzing a drying oil by fermenting it in the presence of water with an enzyme capable of hydrolyzing glycerides, and heating the partially esterified glycerides resulting from the fermentation with an organic polybasic acid and a polyhydric alcohol.

6. A process of making polyhydric alcohol-polybasic acid resins which comprises partially hydrolyzing a drying oil by fermenting it in the presence of water with an enzyme capable of hydrolyzing glycerides, and heating the partially esterified glycerides resulting from the fermentation with an organic polybasic acid, adding a polyhydric alcohol and heating the mixture until resinification occurs.

7. A process of making coating compositions which comprises partially hydrolyzing a drying oil by fermenting it in the presence of water with an enzyme capable of hydrolyzing glycerides, heating the partially esterified glycerides resulting from the fermentation with a polybasic acid and polyhydric alcohol, and dissolving the resin thus obtained in a suitable solvent.

8. A process of making polyhydric alcohol-polybasic acid resins which comprises partially hydrolyzing a drying oil by fermenting it in the presence of water with an enzyme capable of hydrolyzing glycerides, and heating the partially esterified glycerides resulting from the fermentation with phthalic anhydride and glycerol.

PAUL ROBINSON.